June 19, 1923.

M. F. HANSEN

PLANTER

Filed April 20, 1921  3 Sheets-Sheet 3

1,459,097

M. F. Hansen, Inventor

By Watson E. Coleman, Attorney

Patented June 19, 1923.

1,459,097

UNITED STATES PATENT OFFICE.

MORTEN FREDRICK HANSEN, OF NEW AUBURN, WISCONSIN.

PLANTER.

Application filed April 20, 1921. Serial No. 463,084.

*To all whom it may concern:*

Be it known that I, MORTEN FREDRICK HANSEN, a citizen of the United States, residing at New Auburn, in the county of Chippewa and State of Wisconsin, have invented certain new and useful Improvements in Planters, of which the following is a specification, reference being had to the accompanying drawings.

This invention relates to planters, and more particularly to a check row planter for planting potatoes.

An important object of the invention is to provide an improved checker control apparatus of this character which is extremely simple in construction and operation and which may be very cheaply manufactured.

A further object of the invention is to provide a novel dispensing apparatus for distributing seed potatoes from the machine.

Other objects and advantages of the invention will become apparent throughout the course of the following description.

In the accompanying drawings, wherein for the purpose of illustration is shown a preferred embodiment of my invention and wherein like reference characters designate like parts throughout, Figure 1 is a longitudinal sectional view taken through a planter constructed in accordance with my invention;

Figure 8 is a section on the line 8—8 of Figure 2.

Figure 1:
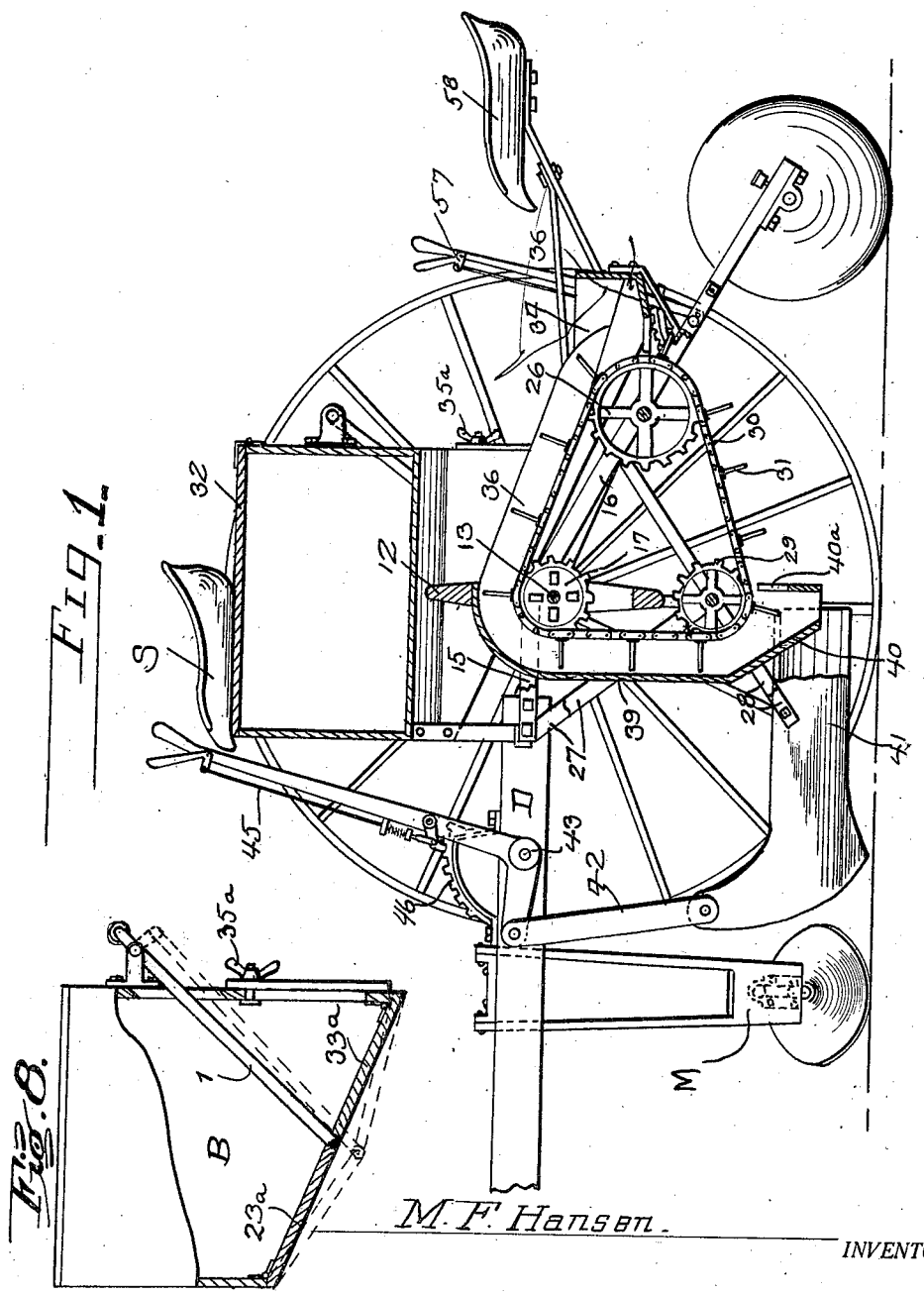
Figure 2:
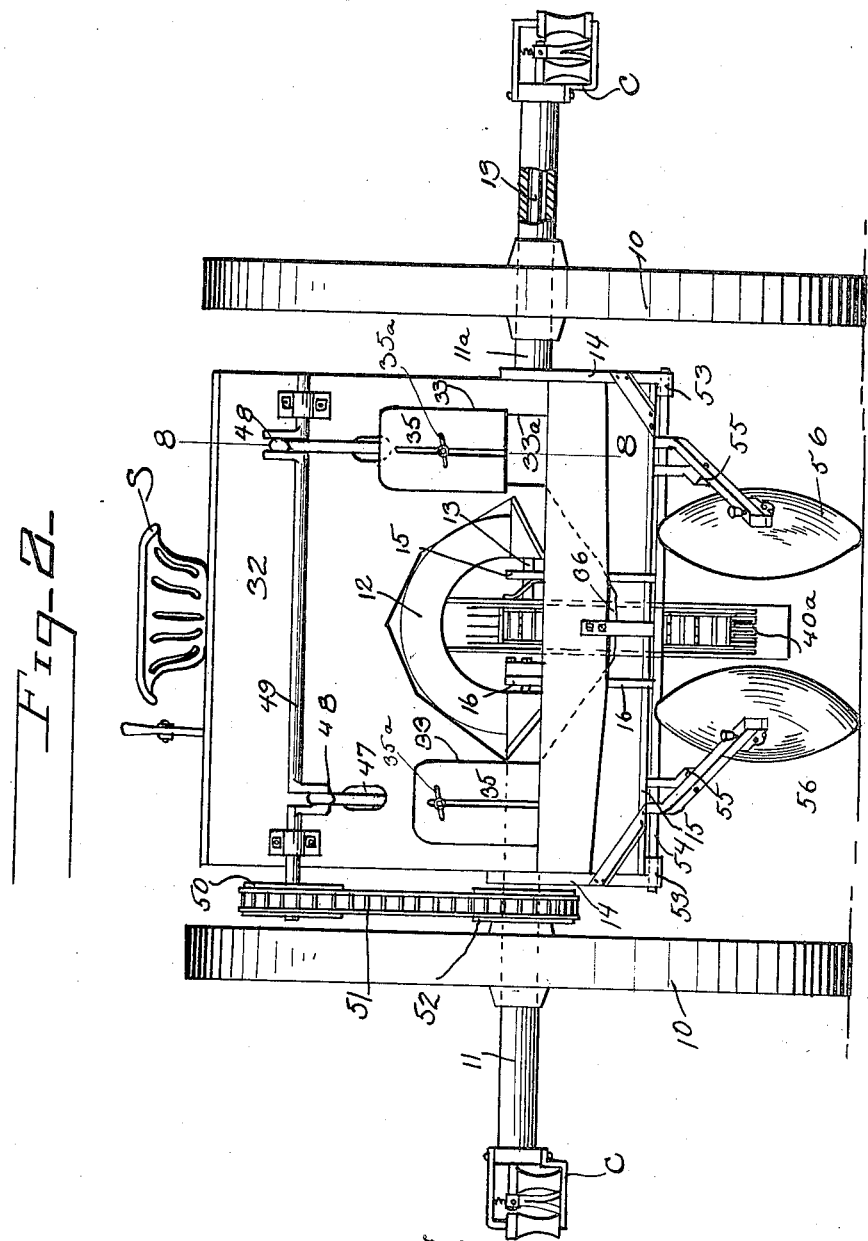
Figure 2 is a rear elevation thereof.
Figure 3:
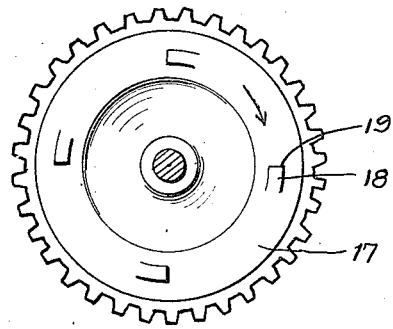
Figure 3 is a side elevation of the feed controlling ratchet.
Figure 5:
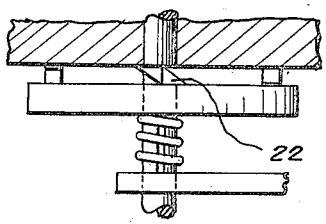
Figure 5 is a plan view of the drive for the feed ratchet.
Figure 4:
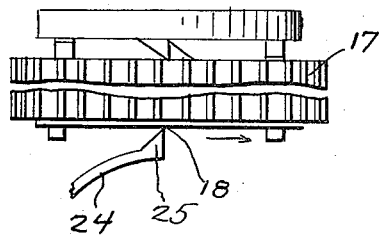
Figure 4 is a plan view thereof showing fragmentary portions of the controls therefor.
Figure 6:
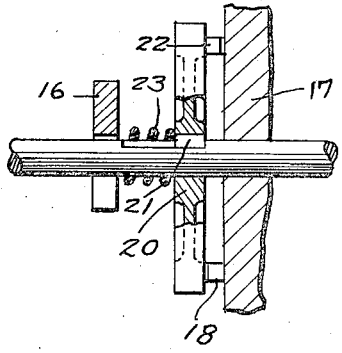
Figure 6 is a partially sectional side elevation thereof.
Figure 7:
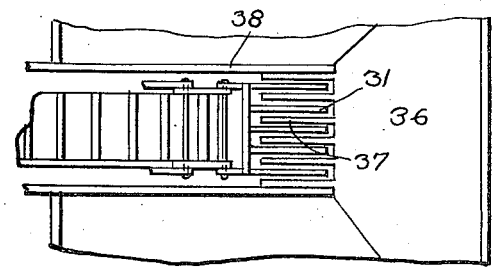
Figure 7 is a detail view showing the feed trough at the point of the entrance of the potatoes to the feed chain.

Referring now more particularly to the drawings, the numeral 10 indicates supporting wheels each mounted upon a section 11 or 11$^a$, of a tubular supporting axle. The inner ends of the supporting axle are arranged in spaced relation and are connected by suitable braces 12. Mounted within the bore of the axle sections 11 and 11$^a$ is a shaft 13 of a checker mechanism C, which checker mechanism is carried by the outer ends of the axle sections 11 and 11$^a$. The shaft 13 is continuous and accordingly is exposed intermediate the inner or adjacent ends of the axle sections 11 and 11$^a$.

The numeral 14 designates a frame embodying side members 14 pivoted upon the axle sections 11 and 11$^a$ and connected at their rear ends by a crossbar 15. To this crossbar are secured braces 16 extending adjacent the shaft 13 intermediate the adjacent ends of the axle sections 11 and 11$^a$ and having their forward ends secured to a tongue or drawbar D to which the draft will be attached. Mounted upon the shaft 13 intermediate the braces 16 is a sprocket gear 17 provided upon each side face thereof with ratchet teeth 18 having the shoulders thereof arranged rearwardly as respects the direction of rotation of the sprocket gear. This sprocket gear is free to rotate upon the shaft 13. At one side of the sprocket gear 17 is a clutch member 20 mounted upon the shaft 13, and is shiftable longitudinally of the shaft but is held against rotation with relation thereto as by means of a key 21. The clutch member 20 is provided upon its face with ratchet teeth 22 coacting with the ratchet teeth 18 upon the adjacent side face of the sprocket gear 17 and is normally forced into engagement therewith by means of a spring 23 extending between the clutch member 20 and the adjacent members 16. At the opposite side of the sprocket gear 17 a spring tongue 24 is suitably secured to any desired stationary support such as the brace 16 at this side of the gear and embodies a lug 25 coacting with the ratchet teeth 18 of the opposite side of the gear 17. This lug effectually prevents rotation of the sprocket gear 17 in any direction but that assuring proper feeding.

As is well known to those familiar with the art, in check row mechanism the shaft thereof, as exemplified by the shaft 13 in the present instance, is by the engagement of the buttons in the checker mechanism C oscillated in one direction a predetermined amount, and when the button releases is returned to normal position by means of a spring. As this mechanism is old and well known in the art and forms no portion of my invention except in so far as it imparts the desired action to the shafts 13, the same is not herein illustrated. Assuming the shaft to be oscillated in one direction by the checker mechanism, the clutch member 20 rotating with the shaft causes the sprocket gear 17 to rotate. This rotation brings the next lug 18 of the opposite side of the sprocket gear 17 into alinement with the lug for engagement thereby, and accordingly when the spring return action of the shaft 13 takes place, return rotation of the sprocket gear is prevented. Accordingly the shaft 13 becomes means for intermittently rotating the sprocket gear 17 in one direction. The braces 16 have rotatably mounted therein, rearwardly of the shaft 13, a pivot for a second sprocket gear 26. Extending downwardly from the draft bar D and from the braces 16 are braces 27 and 28 which combine to form a support for a pivotal mounting for a third sprocket gear 29 and about the sprocket gears 17, 26 and 29, a sprocket chain 30 is passed which is of the desired breadth and which has upstanding therefrom at spaced intervals, forks 31, the tines of which are formed of spaced pegs. These tines 31 are spaced apart a distance equal to the travel of the periphery of the gear 17 at each actuation by the shaft 13.

The numeral 32 indicates a seed box adapted for the reception of seed potatoes and supported by the frame of the planter and embodying discharge legs 33 extending downwardly at each side thereof, the bottom of the discharge legs being inclined rearwardly and discharging into troughs 34 through openings 33ᵃ, controlled by sliding doors 35. The troughs 34 incline rearwardly and likewise incline towards the center so that potatoes entering these troughs roll toward the central portion 36 thereof. This central portion has its forward edge notched to form spaced tongues 37 having therebetween sufficient space to permit of the ready passage of the tines of the forks 31 of the chain 30, but preventing passage of the seed potatoes. The seed potatoes by the inclination of the bottom are caused to roll upon these tongues 37 where they are picked up by the tines of the forks 31 and carried upon the upper run of the chain 30 intermediate spaced side walls 38. The side walls 38 are free from connection at their top edges so as to permit viewing of the potatoes passing upon the chain in order that the correct number of sections may be included between each pair of forks 31. The vertical run of the chain or that portion passing from the sprocket gear 27 about the sprocket gear 29, operates within a U-shaped guide 39, the lower end of which is formed with a spout 40 through which the potatoes are discharged into the furrow formed by the shoe 41, the rear end of which is pivotally connected to the forward extremities of the braces 28. The rear face of the spout 40 is preferably arranged slightly rearwardly of a line drawn through the pivotal center of the sprocket gear 29 so that the tines of the forks 31 are directed downwardly in passing through the spout to permit the discharge of their contents through the same. The rear face of the spout 40 is provided with tongues 40ᵃ which, similar to the tongues 37 of the feed hopper, permit passage of the tines of the forks but prevent the passage of potatoes so that the discharge of the seed through the spout is assured.

The forward end of the shoe 41 is pivotally connected by a link 42 with the short arm 44 of a bell crank lever pivoted as at 43, upon the draft bar D, and having the other extremity thereof extending adjacent the driver's seat S of the vehicle, which is preferably located upon the upper side of the seed box 32. The operating arm of the bell crank lever is provided with a latch mechanism 45 coacting with the segment 46 carried by the draft bar D, so that the depth with which the shoe 41 engages the ground may be variably determined. The draft bar D may likewise, if so desired, have pivotally connected thereto a marker M for marking the succeeding row.

In order that the feeding of the potatoes from the hopper may be assured, the inclined bottom B of the discharge legs 33 is composed of hingedly connected sections 33ᵃ, which are pivotally connected by links 47 to the cranks 48 of the crank shaft 49, rotatably mounted upon the said hopper 32 and have secured to the end thereof a sprocket gear 50. This gear is connected by a sprocket chain 51 with a gear 52 secured to the hub of one of the supporting wheels 10, so that when the wheels are rotated the sections 33ᵃ of the bottoms B are reciprocated, shaking the potatoes down within the hopper and causing the same to feed through the doors. The vertical adjustment of these doors will be secured by a clamping butterfly nut 35ᵃ or the like. The rear end of the frame and more particularly the side members 14 thereof, has extending rearwardly therefrom, bearing 53 in which is rotatably mounted a transverse shaft 54. Secured to this shaft and held against rotation with relation thereto, are rearwardly extending arms 55, bearing disks 56 for closing the furrow formed by the shoe 41. The vertical positioning of these disks may be controlled by means of a segment lever 57 readily operable from the observer's seat 58 which may be occupied by a small boy whose only duties will be the adjustment of the lever 57 and the observation of the potatoes passing upon the chain 30 to prevent two few or too many sections thereof being fed at the same time.

Many changes being possible in the shape, size and arrangement of the various parts hereinbefore set forth without in any manner departing from the spirit of my invention, I do not limit myself to the specific structure thereof except as hereinafter claimed.

What I claim is:

In a check row planter, the combination with a main frame carrying furrow opening and closing members, of a main axle comprising a pair of axially aligned tubular sections having their adjacent ends spaced, a checker shaft rotatably mounted in said tubular sections, means for actuating the checker shaft, a sprocket wheel rotatably mounted upon said checker shaft, a pair of idler sprockets mounted on the main frame, a seed dispensing belt trained about the idler sprockets and about the sprocket wheel, means for intermittently connecting said first mentioned sprocket to the checker shaft, whereby said belt delivers a charge of seed upon each actuation of said sprocket wheel, and means for raising and lowering the furrow opening and closing members.

In testimony whereof I hereunto affix my signature.

MORTEN FREDRICK HANSEN.